Aug. 9, 1966  A. F. MATAGNE  3,264,934
METHOD OF AND APPARATUS FOR PROJECTING LIGHT IMAGES
Filed Aug. 20, 1963  3 Sheets-Sheet 1
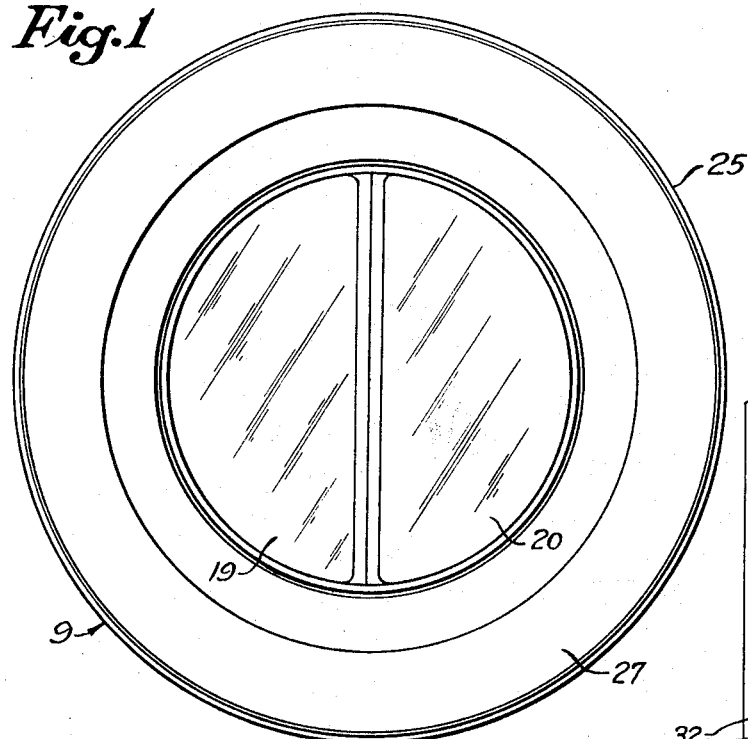
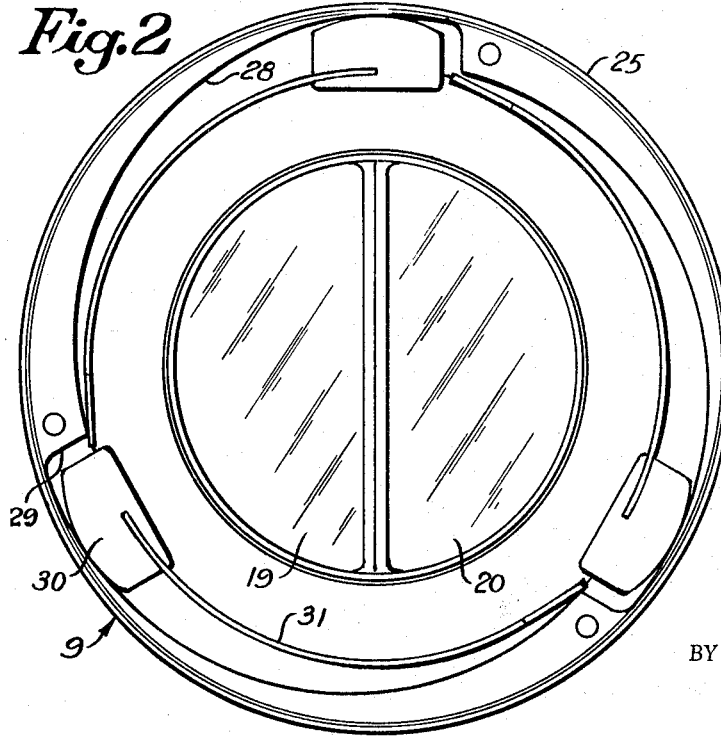
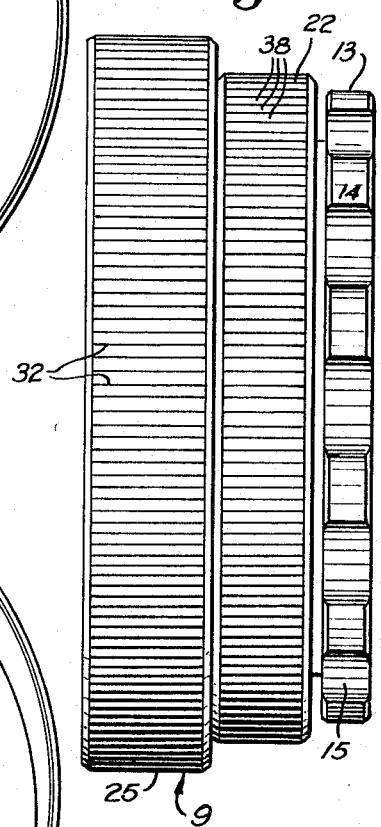
INVENTOR.
A. F. MATAGNE
BY Richards & Geier
ATTORNEYS

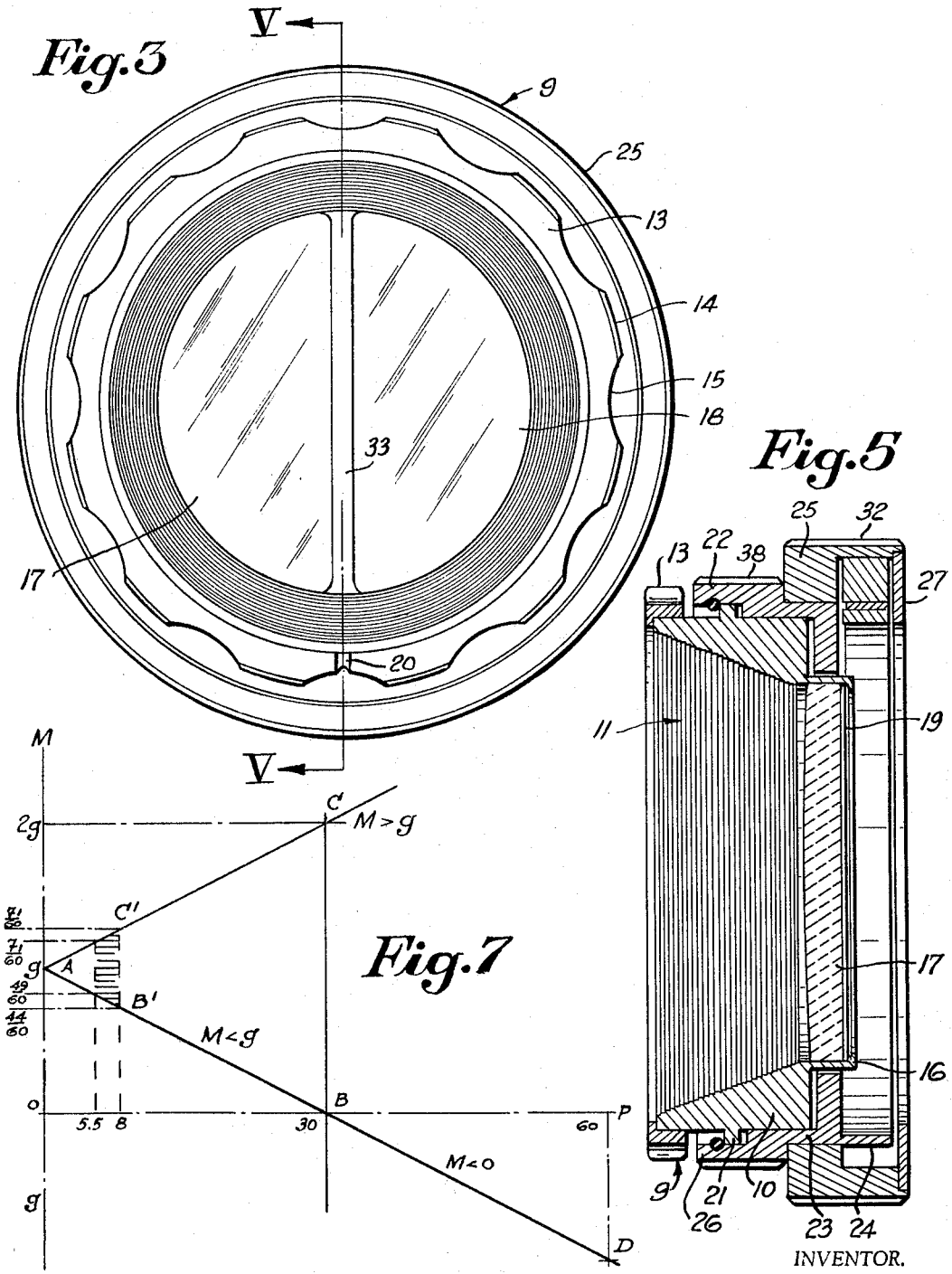

Aug. 9, 1966 A. F. MATAGNE 3,264,934
METHOD OF AND APPARATUS FOR PROJECTING LIGHT IMAGES
Filed Aug. 20, 1963 3 Sheets-Sheet 3

INVENTOR.
A.F. MATAGNE
BY Richards & Geier
ATTORNEYS

United States Patent Office 3,264,934
Patented August 9, 1966

3,264,934
METHOD OF AND APPARATUS FOR
PROJECTING LIGHT IMAGES
Alfred Fulgence Matagne, 44 Passage Lemonnier,
Liege, Belgium
Filed Aug. 20, 1963, Ser. No. 303,274
Claims priority, application Belgium, Feb. 24, 1955,
535,959; June 29, 1955, 539,397
4 Claims. (Cl. 88—24)

This invention relates to a method of and an apparatus for projecting light images.

The present application is a continuation-in-part of my copending patent application Serial No. 15,860, filed March 18, 1960, which is a continuation-in-part of a now abandoned patent application Serial No. 567,309, filed February 23, 1956 with the priority of Belgian Patents, Nos. 535,959, filed February 24, 1955 and 539,397, filed June 29, 1955.

Stereoscopic methods known in prior art are based essentially on the principle of the parallax of the eyes. These methods reconstruct three-dimensional perception produced by the parallax of images registered by both eyes in binocular vision by the use of specially constructed projectors which achieve a double projection in two different colors. These images are viewed by an observer through a pair of spectacles having colored glasses related to the colored images.

An object of the invention is to provide a method and simple apparatus which can be fitted directly on the normal objective of existing projection apparatus and which will produce a projection having a novel effect, inasmuch as the screen seems to disappear completely so that the projection appears to be in space and has a remarkable appearance of depth and reality.

Other objects of the present invention will become apparent in the course of the following specification.

The present invention is based essentially on the discovery that a three-dimensional image can be obtained not only a stereoscopic effect, but also by the so-called space effect or spacial projection which results from the convergence of the optical axes of the eyes. Consequently, according to this invention the viewer sees the objects at their correct distances by the convergence of the optical axes of the eyes, which is a much more faithful reproduction of actual vision.

Another important distinction is that while in accordance with the stereoscopic effect the viewer sees the objects of an image upon different planes, in accordance with this invention the viewer sees the distances at which the objects are actually located.

In the simplest embodiment of the present invention, an image produced by an ordinary projector is divided into two identical images which are polarized to the extent of 90°, respectively, and are shifted horizontally to an extent which will be described in detail hereinafter, upon a metal screen. This double image is observed upon a metal screen by means of eye glasses which are also polarized to the extent of 90°. Thus, each eye sees actually only one image.

The device can be used for all usual types of pictures projected by the usual projector. To carry out the invention, it is merely necessary to attach to the objective of the usual projector a special attachment containing two identical suitably polarized prisms. Consequently, the device projects two divergent luminous bundles which form upon a metal screen two identical distant images. The screen must be metalized so as to preserve its polarization to the reflected light.

The invention will appear more clearly from the following detailed description when taken in connection with the accompanying drawings showing by way of example, a preferred embodiment of the inventive idea.

FIGURE 1 is a front view of the device of the present invention.

FIGURE 2 is a similar view with the cover plate removed.

FIGURE 3 is a rear view.

FIGURE 4 is a side view.

FIGURE 5 is a section along the line V—V of FIGURE 3.

FIGURE 7 is a diagram showing the distance of the projector from the screen as a function of the spacing of the two images upon the screen.

Figure 8:
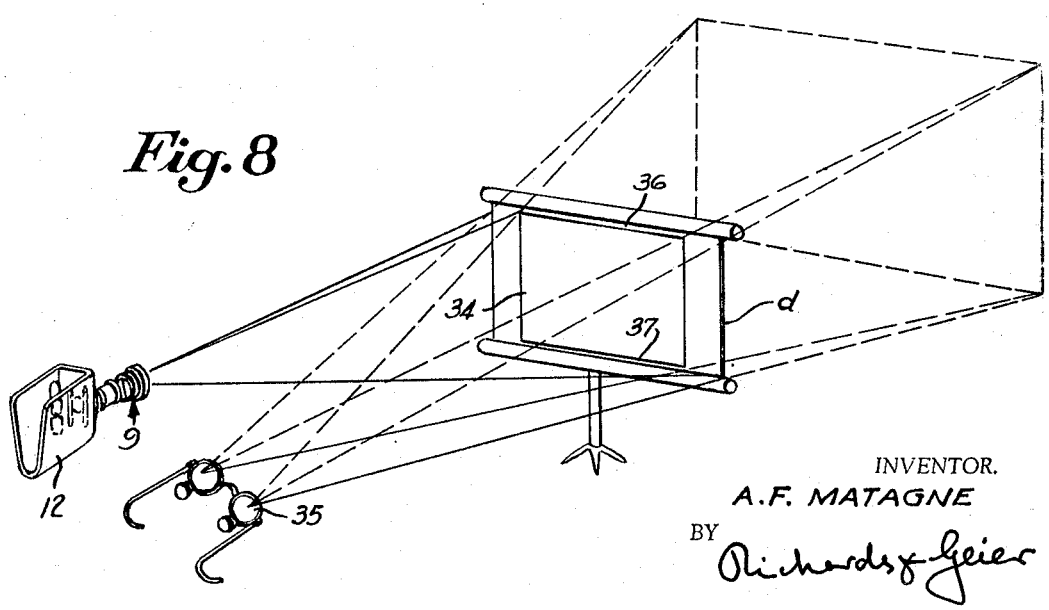
FIGURE 8 is a diagrammatic perspective view illustrating the projected images upon a screen.

The projection device 9 shown in FIGURES 1 to 5 comprises a support 10 which has a substantially cylindrical outer surface and an inner diverging conical surface 11 provided with screw threads. The projection device may be conveniently mounted upon any usual projector 12 (FIG. 8). A ring 13 is firmly fixed to an outer circumferential edge of the support 10 and extends somewhat beyond the support 10. The outer surface of the ring 13 is provided with circumferentially spaced projections 14 which are separated by recesses 15. The opposite end of the support 10 has the shape of a tube 16 which carries two semi-circular prisms 17 and 18. Two semi-circular inversely polarized glass plates 19 and 20 are located in front of and in alinement with the prisms, and are also carried by the tube 16. The plates 19 and 20, as well as the prisms 17 and 18 are firmly connected to the support 10, so that the support 10 is rotatable as one unit with the ring 13, the prisms 17 and 18 and the plates 19 and 20. The outer and inner surfaces of the ring 13 carry marking 20, such as a colored strip, to indicate the location 33 wherein the prism 17 and the plate 19 face the prism 18 and the plate 20.

The outer surface of the support 10 is provided with an annular rib 21. An outer sleeve 22 encloses the rib 21 and is provided with a flange 23 extending close to the tubular portion 16 of the support 10. The outer surface of the sleeve 22 is provided with closely located ribs 38 which may have a distinct coloring. The sleeve 22 is also integral with an extension having the shape of a ring 24.

An outer ring 25 is mounted over an outer portion of the sleeve 22 and has an inner edge located close to a shoulder 26 of the sleeve 22. The ring 25 is recessed adjacent its outer end, thereby forming an annular groove which is enclosed from the outside by an annular flange 27.

The ring 25 has outer ribs 32 and inner curved surfaces 28 terminating in shoulders 29. As shown in FIG. 2, in the example illustrated there are three such curved surfaces 28 and three shoulders 29. There are three stops 30 adapted to engage the shoulders 29. The stops 30 are fixed to the ends of curved springs 31, the opposite ends of which may be integral with the ring 24 of the sleeve 22.

It is thus apparent that a user can rotate the sleeve 22 in the counter-clockwise direction (looking in the direction of FIG. 2), relatively to the ring 25 whereby the stops 30 will slide over the shoulders 29 and will be held in the grooves 28 by the springs 31. On the other hand, movement in the opposite direction will cease when the stops 30 come to bear against the shoulders 29. The support 10 along with the ring 13, the prisms 17 and 18 and the plates 19 and 20 is rotatable in opposite directions relatively to the sleeve 22 and the ring 25, so as to set the correct position of the prisms. The projections 14 upon the ring 13, the ribs 38 upon the sleeve 22 and the ribs 32 upon the ring 25 greatly facilitate manual turning of the various rotary parts by the user.

In operation, the described device 9 can be attached to any available projector 12. It can be used for viewing slides or motion pictures. When the device 9 is mounted upon a projector 12, care must be taken that the slit 33 between the two prisms extends vertically and that the focus is properly adjusted.

In order to see three-dimensional pictures the projector 12 with the attachment 9 mounted thereon must be used with polarizing spectacles 35 and a metallic silver screen 34.

The projecting device 9 projects two polarized images comparatively closely to each other upon a single screen 34. To produce the proper effect, the two images should cover the entire screen. As indicated in FIG. 8, the left eye of the viewer using the polarized spectacles will see only the image shifted to the left, which the right eye will see only the image shifted to the right. The composite image will seem to the viewer to be far behind the screen.

Figure 6:
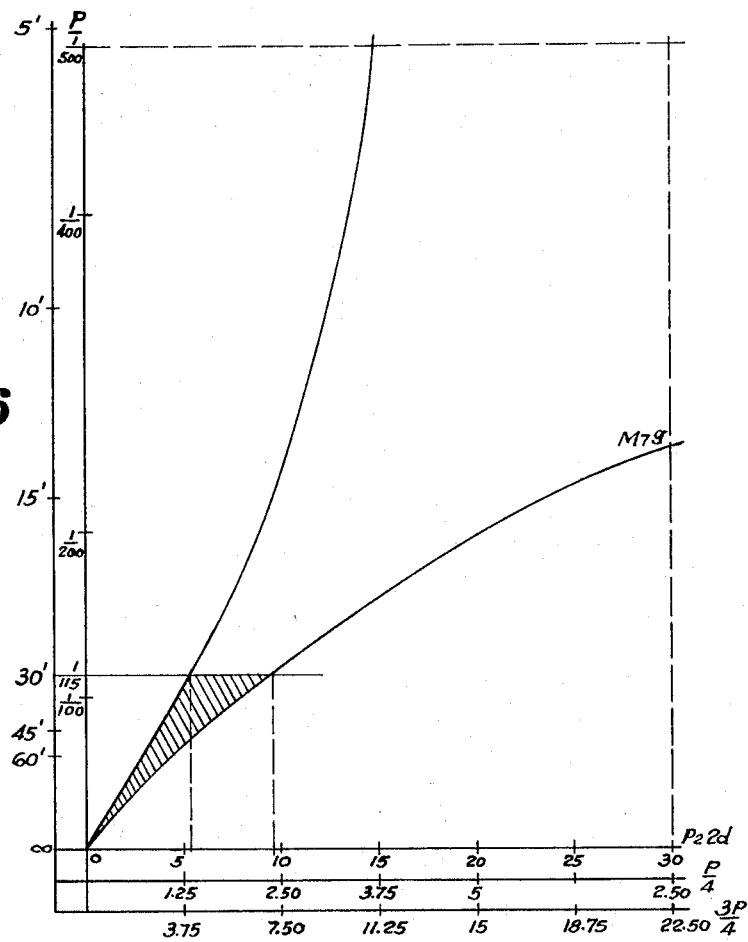
FIGURE 6 is a diagram showing the distance of the projector from the screen as a function of the angle of the prism.

The following mathematical formulae are applicable to determine the proper distance of the projector from the screen as a function of the angle of the prisms and of the spacing of the two images upon the screen, as indicated in the diagrams of FIGS. 6, 7 and 8.

Let it be assumed that:

$g$ = distance between the eyes;
$M$ = distance between the two images upon the screen;
$d$ = distance of the viewer from the screen;
$x$ = distance at which the viewer sees the virtual image, which is the combination of two real homologue images upon the screen.

These quantities are interrelated by the following formulae:

$$x = \frac{d \cdot g}{g - M} \quad \text{and} \quad M = g \cdot \frac{x - d}{x}$$

All these quantities are expressed in the same units, for example, millimeters.

In accordance with the present invention all the homologue points of the two images are shifted by the same quantity $M$. Due to the interposition of the prisms the viewer sees a virtual image projected into space outside of the screen at the distance $x$ which is determined by the above formulae.

Consequently, mathematically speaking, the eyes of an observer see merely a flat virtual image similar to that which would be projected upon the screen by an ordinary projector, but spaced from the screen since the image is located at a distance $x$ which is different from the distance $d$, the latter being the distance at which a viewer would see a real image upon the screen if ordinary projection were used.

It should be noted that the distance $x$ can have any desired value; it is merely necessary to determine $M$.

The "increase" of the virtual screen can be calculated from the size of the real screen. Let it be assumed that $E'$ and $E$ are at their respective dimensions; then the following formula is applicable:

$$\frac{E'}{E} = \frac{g}{g - M}$$

It is also necessary to determine the optimum distance $d$ in such manner that the observer should always see the image, real or virtual, under the same angle at which the objective of the camera has seen it. This is indispensable to satisfy the rule of the plane perspective.

If $f$ and $F$ are the focal lines of the camera and the projector, respectively, and if $P$ is the distance of the projector from the screen, i.e., the width of the auditorium, then it is apparent that $$d = P \times \frac{f}{F}$$

It should be noted that $M$ is positive if it is of the same sign as $g$, i.e., if the visual axes do not intersect each other in front of the screen. If $x$ is negative, i.e., if $M$ is greater than $g$, the virtual image will be produced behind the spectator. However, from a practical point of view this does not provide any difficulties, since the virtual image is shifted instinctively by the human brain.

As already stated, all the conjugated images are in the same plane outside of the screen, $x$, like $M$, bein constant.

However, the three-dimensional appearance of an object located beyond a certain distance—which depends on the subject, the lighting conditions and conditions of contrast—will not be provided any more by the convergence of visual axes, but by visual habit, such as the relative size of the images upon the retina, relative movement of objects, etc.

On the other hand, for very close objects—and if the photograph is properly made—the three-dimensional appearance is provided by relating these objects to others which are further removed, by utilizing a wide angle objective, extending lines, large surfaces, etc., provided that the rules of perspective are complied with.

Practical experience has shown that if $x$ is between 15 and 20 meters, a well made photograph will have a three-dimensional appearance at all distances. Still better results are attained with a film showing the objects in movement along a direction close to that of an optical axis. This impression is further accentuated by upwardly or downwardly sloping views.

The three-dimensional effects are attained if the virtual image is clear and without faults. The grain of the screen disappears and the image has the appearance of being mounted on glass, which may be described as the fluidity of the image.

The proper angle for the prisms can be determined on the basis of the following calculations:

A ray of light passing through a narrow prism close to its apex will be deviated toward the base of the prism by the angle $r$. If $p$ is the angle of the apex (diedre) of the prism and $n$ the refractory index in relation to air, then $$r = (n - 1) \times p$$

or $$p = \frac{r}{n - 1}$$

If $P$ is the distance of the projector from the screen and $M$ is the relative shifting between the two images, then $$\frac{M}{p} = 2r$$

wherein $r$ is expressed in radians.

For the glass of the prism $n = 1.5$, and thus $$p = \frac{r}{as} = 2r = \frac{M}{P}$$

by replacing the value of $M$ it follows that $$p = g \cdot \left(\frac{1}{p} - \frac{d}{p \cdot x}\right)$$

when $M$ is smaller than $g$ and $$p = g \cdot \left(\frac{1}{p} + \frac{d}{p \cdot x}\right)$$

when M is greater than g. On the other hand, it is necessary that $$d = P \cdot \frac{f}{F}$$

for the auditorium; in general $$\frac{f}{F} = \frac{1}{r}$$

and $$d = \frac{P}{2}$$

(I) $$p = g \cdot \left(\frac{1}{P} - \frac{1}{2x}\right)$$

and (II) $$p = g \cdot \left(\frac{1}{P} + \frac{1}{2x}\right)$$

These symmetrical formulae show that P is preponderant if it is comparatively weak, namely, if the auditorium is of small depth.

As already stated, if M is negative, the virtual image is formed in front of the screen, which is convenient for long rooms if $x$ is adopted as being between 10 and 20 meters.

In accordance with the present invention, the value of $p$, i.e. the prism angle is 30' or 1/115 radians. Then $$M = \frac{P}{115}$$

FIGURE 6 of the drawings is a diagram showing $p$ as a function of P which is traced in the following manner:

In the above Equations (I) and (II), $x$ will be assumed as having the value of 15 meters, or $15 \times 10^3$ millimeters, and $g$ as having the average value of 60 millimeters; then (I') $$P = \frac{60}{p} - \frac{1}{500}$$

and (II'') $$P = \frac{60}{p} + \frac{1}{500}$$

In the diagram of FIGURE 6, the ordinates are the reverse values of $p$ expressed in radians and minutes; the abscissae have three scales;

$$P, \frac{P}{4} \text{ and } \frac{3P}{4}$$

they correspond in principle to the depth of the auditorium, namely, to double the optimum distance of vision, then to the observer who is closest to the screen and, finally, to the one who is furthest removed from the screen.

Then the two curves shown in FIGURE 6 are obtained which are valid only for the subject of the present invention.

The area between the two curves is not suitable for the present invention, since M is too close to g, so that the observer would see the virtual screen at too great a distance, or at infinity.

If on the diagram the value of P is taken as 30', it is apparent that for M smaller than g, P is smaller than 5 meters, while projectors for amateur films operate at a distance greater than 5.5 meters. Therefore, it is necessary to consider only the zone wherein M is greater than g.

P minimum should be about 8 meters and the viewers should be located within the range of between 2 meters and 6 meters from the screen. This value of P is the minimum for amateur presentations.

It should be also noted that there is a relation between M and $d$ which is set experimentally by the limits of the divergence of the visual axes. For normal vision $d$ should be greater than 10 meters. Since $M = P \cdot p$ and since $d$ must be also greater than $P/4$, it will be determined that $p$ must be smaller than 1/40. This is accomplished according to the present invention, since $p$ is equal to 1/115.

FIGURE 7 is a diagram showing M as a function of P.

If we take into consideration the values adopted for $x$ (15 meters) and $d$ ($P/2$), and if we start with the formula $$M = g \frac{x - d}{x}$$

then (1) for M smaller than g:

$$M = g \cdot \left(1 - \frac{P}{30}\right)$$

(2) for M larger than g:

$$M = g \cdot \left(1 + \frac{P}{30}\right)$$

P being in meters.

As shown in FIGURE 7, these are equations of two straight lines, having equal angular coefficients but opposite signs.

If we take into consideration the shaded "unusable" zone of P in FIGURE 6, it is possible to determine the minimum and maximum values of $g$ which correspond to the limits of this zone.

Furthermore, as already stated, for very long halls, namely those longer than 30 meters, it as advantageous to use a negative $g$, so that the axes will intersect in front of the screen.

The diagram of FIGURE 7 confirms that if M is made greater than $g$, there is much greater latitude in adopting the present invention to different lengths of halls for amateur presentations. In fact if M is smaller than $g$, as indicated by the line B'—B of FIGURE 7, M soon assumes a small value the result of which is that the virtual screen will be located too closely.

If an auditorium of predetermined length P is given, the variations of $x$ as a function of $d$ can be determined as follows:

If P and $p$ are given and M is constant, it is apparent from the formula $$x = \frac{d \times g}{g - M}$$

that $x$ is directly proportional to $d$. In other words, the virtual screen is further removed from the real screen with the increase in the distance of the viewer from the real screen.

Thus with the values which have been adopted, for $$d = \frac{P}{2}, \ x = 15$$

meters; for $$d = \frac{P}{4}, \ x = 7.5$$

meters and for $$d = \frac{3P}{4}, \ x = 22.5$$

meters.

As far as the increase in the size of the screen is concerned, $$E' = E \frac{g}{g - M}$$

it is the same for all points of the auditorium.

It should be noted that the virtual screen is not a flat surface like the real screen. For example, if the viewer is located upon the optical axis of the projector, the shifting of two images M (at the center of the screen) diminishes in the direction toward the edges of the screen while g remains constant, the viewer following the movements of the visual axis.

By using the general formula $$x = \frac{d \times g}{g - M}$$

the value of $x'$ may be calculated, the angle formed between the visual axis and the optical axis of the projection being designated as $a$:

$$d' = \frac{d}{\cos a}; \quad M' = M \cos a$$

and the ratio $x'/x$ is equal to $$\frac{x'}{x} = \frac{1}{\cos a} \times \frac{M - g}{M \cos a} - g$$

for M greater than g, and $$\frac{x''}{x} = \frac{1}{\cos a} \times \frac{g - M}{g - M \cos a}$$

for M smaller than g.

It can be readily deduced from these calculations that the following conditions will prevail:

If M is smaller than g, the curvature will be directed toward the spectator, i.e., the virtual images will move away at a rate which is a function of the distance of real images from the center of the screen, for values of M ranging between g/2 and g/1.9; for all practical purposes this does not leave any margin of security.

If M is greater than g, the curvature will be directed toward the spectator for values of M ranging between g and 10g. Therefore, it is possible to obtain a substantial curvature.

By way of example, if $$M = \frac{5}{4} g$$

for $$d = \frac{P}{2}$$

it will be found that $$\frac{x'}{x} = 1.2$$

this means that the edges of the screen will appear to be more distant than the center to the extent of 20%.

However, if $$d = \frac{P}{4}$$

it will be found that $$\frac{x'}{x} = 2.22$$

which is a total setback of 120%.

From the above it is apparent that to spectators located close to the screen a picture will appear in true though relative perspective, provided that the projected picture shows objects located upon the closest plane only in the center of the picture. The present invention makes it possible to see in relative relief in most instances objects the distance of which is at least 15 meters.

FIGURE 8 illustrates diagrammatically the actual projection of the two images upon a screen 34 from a projector attachment 9 having the two prisms 17 and 18 and carried by a projector 12.

It is thus apparent that it is most important that the two images be superposed vertically but that they be shifted horizontally to extent of the values given by the above mentioned formula:

$$M = g \frac{x - d}{n}$$

where a definite value is given to $d$ according to the dimensions of the considered projection room.

The screen 34 (FIGURE 8) should be a metallized silver screen preferably provided with means (not shown) for rolling up and unrolling the screen and for properly tensioning it. Best results are obtained with a comparatively large screen of about 6 to 7 feet width viewed from a distance of about 10 feet.

The spectacles 35 have polarized lenses so that for the viewer the two images will coincide far behind the screen, as one image realistic in depth, thereby creating a captivating three-dimensional impression up the spectator. Due to the provision of the metallized screen the grain of the film disappears completely. The viewer has the impression of not looking at a screen, but as looking through a space behind the screen. The reason is that all the points on the screen are situated on nonhomologous points of the retina. The objects of the image appear at their true height and relative position in the depth of the space.

As has been indicated already, by inverting the position of the overlapping images, an object will appear to the spectator as being located in front of the screen. This is particularly effective for closeups or for so-called forward effects in movies. The screen 34 is preferably provided with top and bottom black edges 36 and 37 the purpose of which is to serve as guiding marks for viewers, which are necessary to enable the viewers to locate the invisible screen in space. These black edges or notches provide for the viewers a more effective sensation of space and greatly enhance the perfection of the third dimension.

It is obvious that the prisms and the polarized plates could be of different shapes and could be fixed in many ways different from that described and that the device itself could be fixed on the objective of a projector by any suitable means.

In most cases the device according to the invention can be fitted equally well to picture taking apparatus and to projection apparatus. It can thus be used for the direct production of films or of fixed pictures for different kinds of projection, including stereoscopic projections.

A device according to the invention can obviously be fitted with any usual accessories and be adapted for convenient handling.

It is apparent that the example shown above has been given solely by way of illustration and not by way of limitation, and it is subject to many variations and modifications. All such variations and modifications are to be included within the scope of the present invention.

What is claimed is:

1. An attachment to an objective of a projection apparatus for producing three-dimensional images therewith, said attachment comprising a support, two semi-circular prisms facing each other and mounted within said support, two inversely polarized semi-circular glass plates mounted within said support in alinement with and adjacent to said prisms, a sleeve rotatably mounted upon said support, an outer ring rotatably mounted upon said sleeve and having an annular groove concentrical with said prisms, said groove having a plurality of uniformly spaced shoulders, and resilient means connected with said sleeve and adapted to engage said shoulders.

2. In combination with the attachment set forth in claim 1, a screen having a metalized surface for receiving the images polarized by said plates.

3. An attachment to an objective of a projection apparatus for producing three-dimensional images therewith, said attachment comprising a support having a substantially cylindrical outer surface and a threaded conical inner surface, a ribbed ring firmly fixed to one edge of said support, a tube connected with an opposite edge of said support, two semi-circular prisms facing each other and mounted within said tube, two inversely polarized semi-circular glass plates mounted within said tube in alinement with and adjacent to said prisms, a sleeve rotatably mounted upon said support, an outer ring rotatably mounted upon said sleeve and having an annular groove concentrical with said prisms, said groove having a plurality of uniformly spaced shoulders, and resilient means connected with said sleeve and adapted to engage said shoulders.

4. An attachment to an objective of a projection apparatus for producing three-dimensional images therewith, said attachment comprising a support having a substantially cylindrical outer surface and a threaded conical inner surface, a ribbed ring firmly fixed to one edge of said support, a tube connected with an opposite edge of said support, two semi-circular prisms facing each other and mounted within said tube, two inversely polarized semi-circular glass plates mounted within said tube in alinement with and adjacent to said prisms, a rib upon the outer surface of said support, a sleeve rotatably mounted upon said support and enclosing said rib, an outer ring rotatably mounted upon said sleeve and having an annular groove concentrical with said prisms and having a larger diameter than that of said prisms, said groove having a plurality of uniformly spaced shoulders and curved bottom portions between said shoulders, said sleeve having springs fitting into said bottom portions of the groove, and stops carried by said springs, whereby rotation of said sleeve relatively to said outer ring in one direction causes said stops to slide over said shoulders, while said stops engage said shoulders to prevent rotation in the opposite direction.

References Cited by the Examiner
UNITED STATES PATENTS

| | | | |
|---|---|---|---|
| 1,589,761 | 6/1926 | Lord | 88—24 X |
| 1,843,663 | 2/1932 | Cregier | 88—24 X |
| 1,859,023 | 5/1932 | Burkhardt | 88—24 X |
| 2,304,724 | 12/1942 | Austin | 88—24 |
| 2,674,919 | 4/1954 | Rodriguez | 88—24 X |

OTHER REFERENCES

McKay, 3-Dimensional Photography, Jones Press Inc., 1951, pages 189–195 cited.

JULIA E. COINER, *Primary Examiner.*